US007822959B2

(12) United States Patent
Cors et al.

(10) Patent No.: US 7,822,959 B2
(45) Date of Patent: Oct. 26, 2010

(54) METHOD FOR A SCSI TARGET CONTROLLER TO SAFELY SHUT DOWN AN OPERATING SYSTEM BY THE USE OF A STANDARD SCSI INITIATOR COMMAND

(75) Inventors: Josep Cors, Rochester, MN (US); Russel R. Garvey, Mantorville, MN (US); Andrew T. Koch, Rochester, MN (US); Kyle A. Lucke, Oronoco, MN (US); Randall S. Nelson, Rochester, MN (US); Andrew T. Tauferner, Rochester, MN (US); Eric Thiemann, Hayfield, MN (US); Scott J. Timmerman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 11/621,403

(22) Filed: Jan. 9, 2007

(65) Prior Publication Data

US 2008/0168476 A1    Jul. 10, 2008

(51) Int. Cl.
*G06F 9/00*      (2006.01)
*G06F 9/24*      (2006.01)
*G06F 15/177*    (2006.01)
*G06F 3/00*      (2006.01)
*G06F 9/44*      (2006.01)
*G06F 9/46*      (2006.01)
*G06F 13/00*     (2006.01)

(52) U.S. Cl. .......................... 713/1; 719/326

(58) Field of Classification Search ................ 713/1, 713/2, 100; 714/2, 5, 9, 24; 719/326
See application file for complete search history.

(56) References Cited

U.S. PATENT DOCUMENTS

| 6,892,311 | B2* | 5/2005 | Coppock et al. | ............ 713/300 |
| 7,350,088 | B2* | 3/2008 | Allison et al. | ............... 713/300 |
| 2004/0064460 | A1* | 4/2004 | Pooni et al. | ................. 707/100 |

OTHER PUBLICATIONS

Irina Medvinskaya, Programmatically Shut down a Windows Machine with This API, Jan. 25, 2002, TechRepublic, http://articles.techrepublic.com.com/5100-10878_11-5030366.html.*

* cited by examiner

*Primary Examiner*—Thomas Lee
*Assistant Examiner*—Brandon Kinsey
(74) *Attorney, Agent, or Firm*—Cantor Colburn LLP

(57) ABSTRACT

The present invention relates to a method for the safe shut down of an operating system. The invention utilizes a shutdown-monitoring program that is running in an initiator operating system to periodically transmit and pass-through SCSI command to a SCSI target to determine if a shutdown operations is to be performed upon the operating system. In response to the SCSI command the SCSI target returns data back to the initiator operating system, wherein the shutdown-monitoring program analyzes the data. In the event that the shutdown-monitoring program determines that the operating system is to be shut down, then an operating system shutdown is initiated using at least one appropriate API that is provided by the operating system.

10 Claims, 3 Drawing Sheets

(Prior Art)

METHOD FOR A SCSI TARGET CONTROLLER TO SAFELY SHUT DOWN AN OPERATING SYSTEM BY THE USE OF A STANDARD SCSI INITIATOR COMMAND

BACKGROUND OF THE INVENTION

1. Field of the Invention

This invention relates to performing shutdown operations within an operating system, and particularly to the utilization of information from a target device to assist in shutdown operations within an operating system.

2. Description of Background

Before our invention, conventionally, as shown in FIG. 1, an operating system 100 that was configured to utilize a small computer system interface (SCSI) initiator 115 communicated via a SCSI bus 125 to a SCSI target 120 of a target controller 105. In certain instances the target controller was required to go offline, for example: in response to a device operator command, the main power to the device being lost, or the detection of a condition wherein data integrity could be compromised in the event of an additional operational error. In the event that the target controller went offline without the initiator operating system being safely shut down, results of the shutdown could have severe consequences. Potential damage from the shutdown could include the loss of data, in addition to the corruption of critical operating system data, in the instance that the target controller managed the system drive.

Thus, there exists a need for a methodology for performing the safe shutdown of an operating system in order to avoid the potential loss and corruption of vital system data.

SUMMARY OF THE INVENTION

The shortcomings of the prior art are overcome and additional advantages are provided through the provision of a method for a SCSI target controller to safely shut down an operating system using a standard SCSI initiator, the method further comprising the steps of receiving a request to shut down an initiator operating system at a shutdown-processing component of a target controller that is comprised within a target device, writing data relating to the initiator operating system shutdown request to a vital product data page at the target controller, wherein the vital product data page is configured to be accessed by a SCSI target, and transmitting from a shutdown-monitoring component of the initiator operating system an command requesting the vital product data page, via a SCSI initiator to the SCSI target.

The method further comprises the steps of receiving the request for the vital product data page data at the SCSI target, transmitting the vital product data page data from the SCSI target to the shutdown-monitoring component via the SCSI initiator, processing the vital product data page data in order to determine if the initiator operating system should be shut down, and shutting down the initiator operating system by use of an application programming interface that is provided by the initiator operating system.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

SCSI is a standard interface and set of command definitions that is implemented for the transfer of data between devices on internal and external computer busses. In particular, SCSI commands are used to facilitate the communication between a SCSI initiator and a SCSI target. In application, the SCSI initiator is configured to transmit commands to a SCSI target, wherein in response to a command the SCSI target transmits a reply back to the SCSI initiator. Specifically, SCSI commands are transmitted in command descriptor blocks, wherein the command descriptor blocks comprise an operation code that is appended by command specific parameters.

The present invention relates to a methodology for the safe shutdown of an operating system. Within aspects of the present invention, a shutdown-monitoring program is implemented to run in an initiator operating system. As part of its functional operations, the shutdown-monitoring program periodically transmits a pass-through SCSI command (e.g., a SCSI inquiry command) to a SCSI target to inquire if a shutdown operation is to be performed upon the operating system. In response to the SCSI command the SCSI target returns data back to the initiator operating system, wherein the shutdown-monitoring program analyzes the returned data. In the event that the shutdown-monitoring program determines that the returned data specifies that the operating system is to be shut down, a shutdown of the operating system is initiated by the use of application programming interfaces (APIs) that are provided by the operating system.

Figure 1:
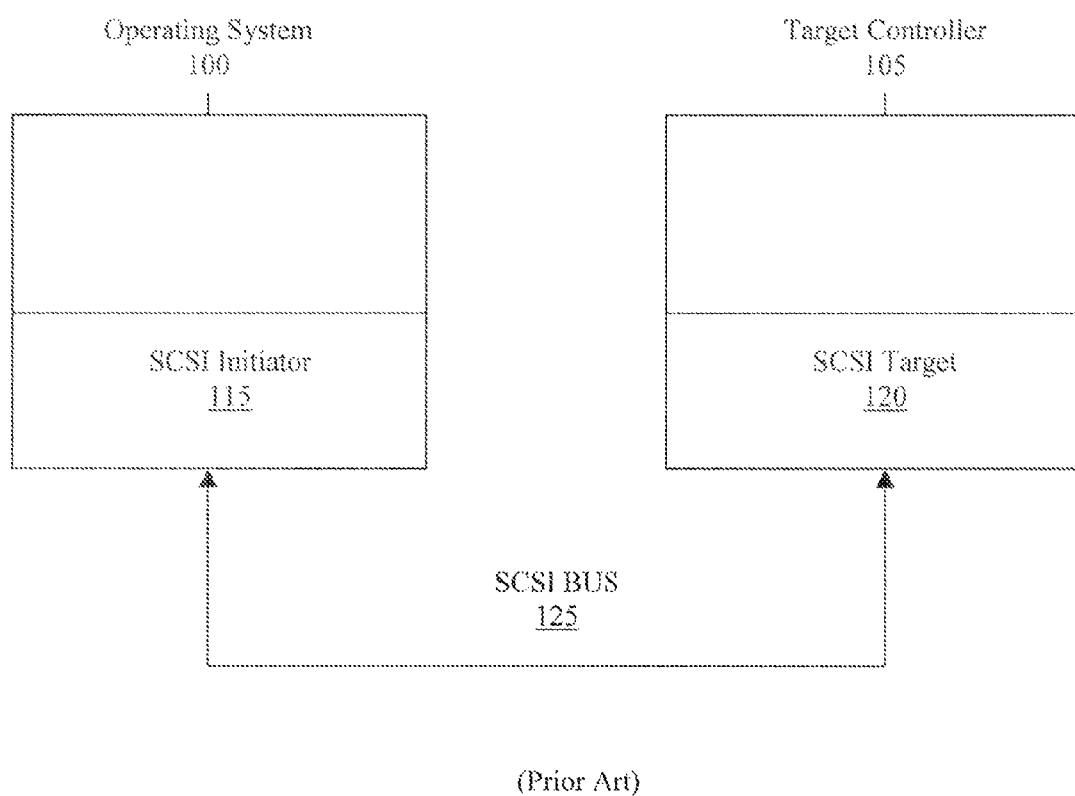
FIG. 1 illustrates one example of a prior art diagram showing a SCSI initiator of an operating system in communication with a SCSI target of a target controller.
Figure 2:
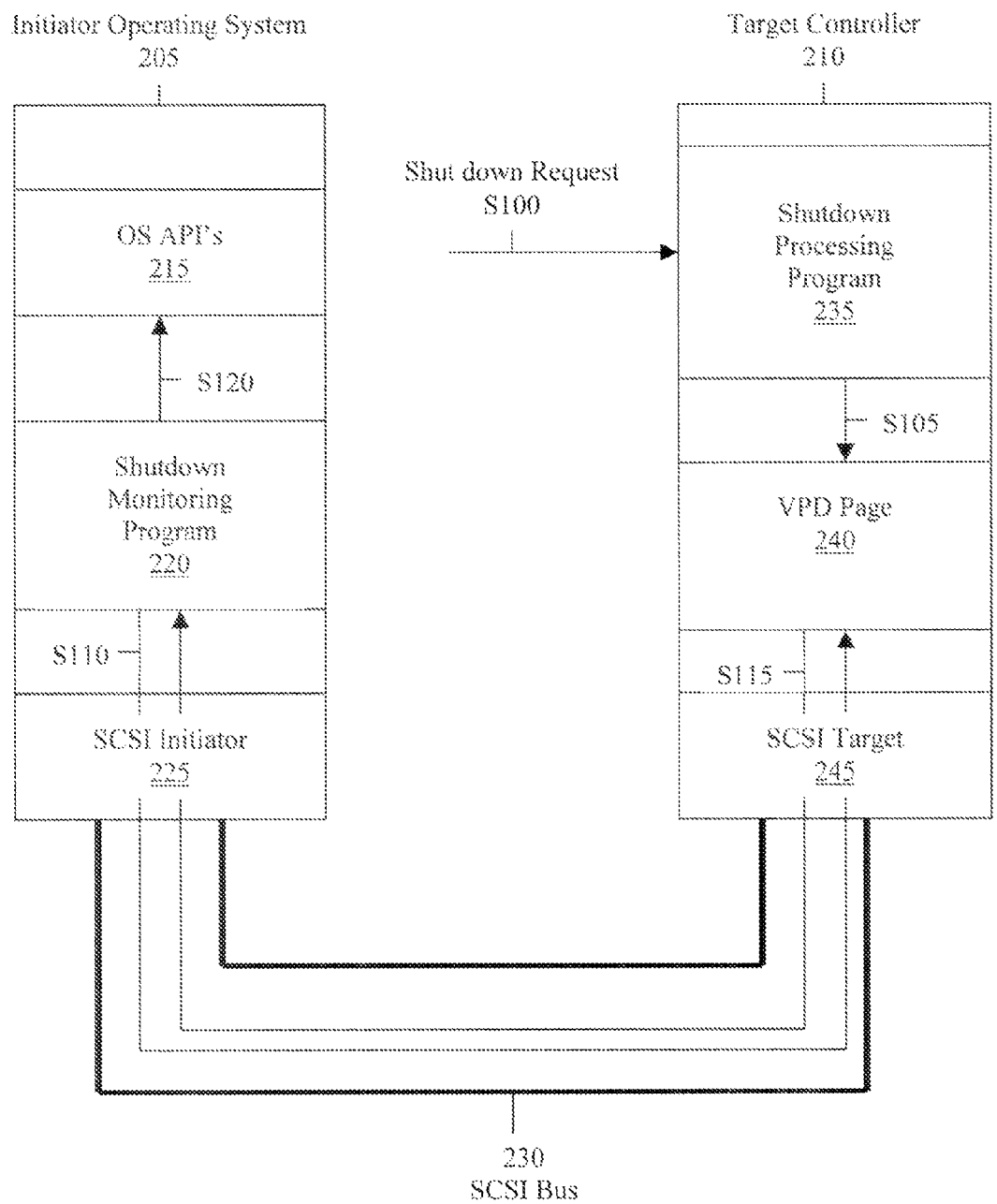
FIG. 2 illustrates one example detailing the functional components of aspects of an embodiment of the present invention.

Turning now to the drawings in greater detail, it will be seen that in FIG. 2 there is a diagram detailing an initiator operating system 205 that is in, communication with a target controller 210 of a target device. The communication between the two entities is facilitated via a SCSI bus 230. Within aspects of the present invention the SCSI bus 230 does not specifically refer to a directly attached SCSI bus, but rather to any satisfactory SCSI storage technology (e.g., Parallel SCSI, SAS, Fibre Channel, iSCSI, etc. . . . ). The initiator operating system 205 and target device controller 210 can comprise a plurality of functional software components. For the purpose of describing aspects of the present invention all of the operational software components of the initiator operating system and the target controller 210 are not shown. Further, as shown in FIG. 2, the initiator operating system 205 further comprises at least one operating system API 215, a shutdown-monitoring program 220, and a SCSI initiator 225. The target device controller 210 further comprises a shutdown-processing program 235, a vital product data page (VPD) 240, and a SCSI target 245.

Figure 3:
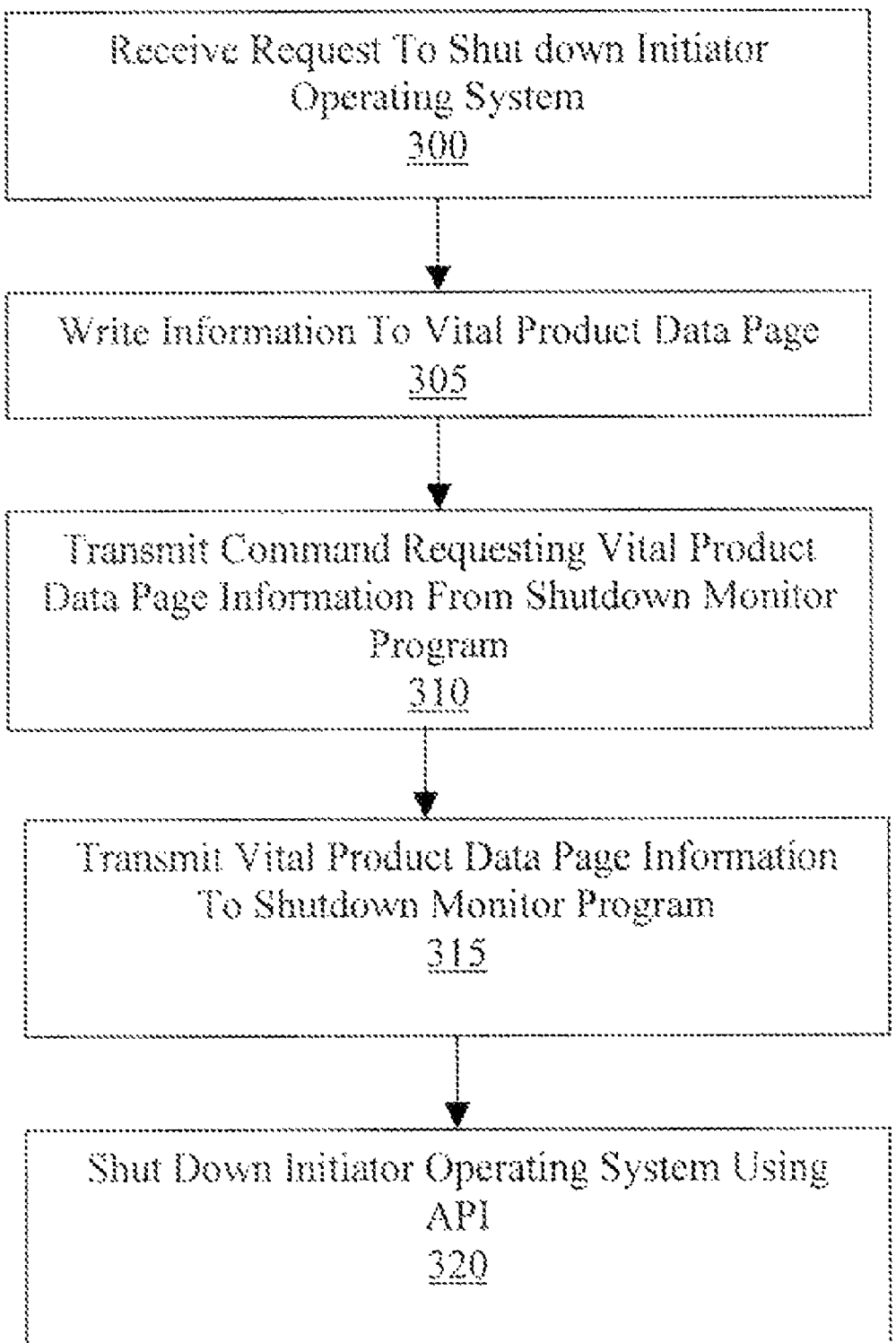
FIG. 3 is a flow diagram detailing a method for the safe shutdown of an operating system.

FIG. 3. shows a flow diagram detailing a method for using the SCSI target controller 210 for the safe shutdown of the operating system 205 by use of a SCSI command. At step 300, a request S100 to shut down an initiator operating system 205 is received at the shutdown-processing component 235 of a target controller 210 that is comprised within a target device. At step 305 the shutdown-processing program writes data S105 relating to the initiator operating system 205 shutdown request to a vital product data page 240 at the target controller 210, wherein the vital product data page 240 is configured to be accessed by the SCSI target 245. Within further aspects of the present invention the vital product page 240 can be configured to be specific to a particular vendor. The shutdown-monitor program 220 transmits S110 a pass-through SCSI command requesting the vital product data page 240 from the SCSI target 245 at step 310.

Within the operating system 205, the shutdown-monitoring program 220 periodically transmits a SCSI command to the SCSI target 245. At step 315, the SCSI target transmits S115 the vital product data page 240 data from the SCSI target 245 to the shutdown-monitoring component 220 by way of the SCSI initiator 225. Thereafter, the shutdown-monitoring component 220 processes the vital product data page 240 data, and based upon the vital product data page 240 data, makes a determination as to whether or not the initiator operating system 205 is to be shut down. In the event that the vital product data page 240 data indicates that the operating system 205 is to be shut down, then at step 320, the shutdown-monitoring program 220 initiates the shutdown of the initiator operating system 205 by the calling of appropriate API(s) 215 to affect the safe shutdown of the initiator operating system 205.

Within further aspects of the present invention, the initiator operating system 205 can be in communication with multiple SCSI targets 245. In this event, a SCSI command will be transmitted via the SCSI bus 230 that is positioned where the initiator operating system's 205 drive is located to the multiple SCSI targets 245. Since each SCSI target 245 is in communication with the initiator operating system 205, the initiator operating system 205 is capable of determining from the multiple SCSI targets 245 if there is to be an imminent operating system 205 shutdown, and thus respond appropriately to any response to a SCSI inquiry.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for the utilization of a SCSI target controller for the safe shutdown of an operating system using a standard SCSI initiator, the method further comprising the steps of:
   receiving a request to shut down an initiator operating system at a shutdown-processing component of a target controller that is comprised within a target device;
   writing information relating to the initiator operating system shutdown request to a vital product data page at the target controller, wherein the vital product data page is configured to be accessed by a SCSI target at the target device;
   transmitting from a shutdown-monitoring component of the initiator operating system, a command requesting the vital product data page via a SCSI initiator of the initiator operating system to the SCSI target;
   receiving the command for the vital product data page data at the SCSI target;
   transmitting the vital product data page data from the SCSI target to the shutdown-monitoring component via the SCSI initiator;
   processing the vital product data page data at the shutdown-monitoring component in order to determine if the initiator operating system should be shut down;
   shutting down the initiator operating system by use of at least one API that is provided by the initiator operating system.

2. The method of claim 1, wherein the vital product data page is associated with a specific vendor.

3. The method of claim 2, wherein the initiator operating system is in communication with a plurality of target controller SCSIs.

4. The method of claim 1, wherein the command is a pass-through SCSI inquiry command.

5. The method of claim 4, wherein the initiator operating system is in communication with a plurality of target controller SCSIs.

6. A computer program product that includes a computer readable medium useable by a processor, the medium having stored thereon a sequence of instructions which, when executed by the processor, causes a SCSI target controller to safely shut down an operating system using a standard SCSI initiator, wherein the computer program product executes the steps of:
   receiving a request to shut down an initiator operating system at a shutdown-processing component of a target controller that is comprised within a target device;
   writing data relating to the initiator operating system shutdown request to a vital product data page at the target controller, wherein the vital product data page is configured to be accessed by a SCSI target at the target device;
   transmitting from a shutdown-monitoring component of the initiator operating system, a command requesting the vital product data page via a SCSI initiator of the initiator operating system to the SCSI target;
   receiving the command for the vital product data page data at the SCSI target;

transmitting the vital product data page data from the SCSI target to the shutdown-monitoring component via the SCSI initiator;

processing the vital product data page data at the shutdown-monitoring component in order to determine if the initiator operating system should be shut down;

shutting down the initiator operating system by use of at least one API that is provided by the initiator operating system.

7. The computer program product of claim 6, wherein the vital product data page is associated with a specific vendor.

8. The computer program product of claim 7, wherein the initiator operating system is in communication with a plurality of SCSI target controllers.

9. The computer program product of claim 6, wherein the command is a pass-through SCSI inquiry command.

10. The computer program product of claim 9, wherein the initiator operating system is in communication with a plurality of SCSI target controllers.

\* \* \* \* \*